United States Patent
Taylor-Smith et al.

(10) Patent No.: US 6,904,919 B2
(45) Date of Patent: Jun. 14, 2005

(54) APPARATUS AND METHOD FOR SEPARATING SUBSTANCES FROM PARTICULATE SOLIDS

(75) Inventors: Ernest J. Taylor-Smith, deceased, late of Vancouver (CA); by Graham Phillips, legal representative, Vancouver (CA); Russell M. Graham, Calgary (CA)

(73) Assignee: Newtech Commercialization Ltd., Calgary (CA)

(*) Notice: Subject to any disclaimer, the term of this patent is extended or adjusted under 35 U.S.C. 154(b) by 0 days.

(21) Appl. No.: 09/877,086

(22) Filed: Jun. 11, 2001

(65) Prior Publication Data

US 2002/0185158 A1 Dec. 12, 2002

(51) Int. Cl.$^7$ .................................. B08B 7/04
(52) U.S. Cl. .............. 134/25.1; 134/10; 134/25.5; 134/32; 134/33
(58) Field of Search ............. 134/1, 10, 25.1, 134/25.5, 32, 33, 40, 42

(56) References Cited

U.S. PATENT DOCUMENTS

| | | | | |
|---|---|---|---|---|
| 4,343,323 A | * | 8/1982 | Kessick et al. ........... 137/13 |
| 4,443,322 A | * | 4/1984 | Jubenville ............... 208/391 |
| 4,929,341 A | * | 5/1990 | Thirumalachar et al. ... 208/390 |
| 5,199,997 A | * | 4/1993 | Stowe .................. 134/25.1 |
| 5,223,147 A | * | 6/1993 | Rosenstock et al. ....... 210/705 |
| 5,264,118 A | * | 11/1993 | Cymerman et al. ........ 208/390 |
| 5,303,871 A | | 4/1994 | Bateson et al. |
| 5,344,255 A | * | 9/1994 | Toor ................ 405/128.75 |
| 6,056,882 A | * | 5/2000 | Scalliet ................ 210/708 |
| 6,110,359 A | * | 8/2000 | Davis et al. ............ 208/390 |
| 6,153,017 A | * | 11/2000 | Ward et al. .............. 134/10 |
| 6,214,236 B1 | * | 4/2001 | Scalliet ................ 210/708 |

FOREIGN PATENT DOCUMENTS

| | | |
|---|---|---|
| DE | 41 37 014 | 5/1993 |
| WO | WO 87/07536 | 12/1987 |
| WO | WO 90/09507 | 8/1990 |
| WO | WO 91/11543 | 8/1991 |
| WO | WO 93/12896 | 7/1993 |
| WO | WO 96/30134 | 10/1996 |

* cited by examiner

*Primary Examiner*—Zeinab El-Arini
(74) *Attorney, Agent, or Firm*—Oyen Wiggs Green & Mutala

(57) ABSTRACT

A method for separating a substance such as a hydrocarbon from a particulate material such as soil is provided. An aqueous slurry is formed and a shear force is applied to the slurry, such as in a reversible helical screw conveyor, while the slurry is vibrated. The substance thus separated can then be removed from the particulate material.

37 Claims, 3 Drawing Sheets

APPARATUS AND METHOD FOR SEPARATING SUBSTANCES FROM PARTICULATE SOLIDS

FIELD OF THE INVENTION

The present invention relates to the field of environmental technology and apparatus and methods for separating substances from particulate solids. More particularly the invention relates to apparatus and methods for the separation of target substances from particulate solids, such as in the remediation of hydrocarbon-contaminated soils.

BACKGROUND OF THE INVENTION

Many industrial applications produce waste products that are partial emulsions of water and oil and which contain one or more contaminants, such as suspended carbonaceous matter or inorganic matter such as rust scales, catalysts, fines, and the like. Two types of oil and water emulsions are commonly encountered, based on the relative amounts of oil and water: the first, an oil dispersed in water emulsion consists of electrically charged oil droplets dispersed in water, in which the friction between the oil and water phases creates static electrical charges at the oil and water interphase and helps to stabilize the emulsion; and the second, a water dispersed in oil emulsion is a viscous, concentrated substance formed when oil comes into contact with water and solids.

The process of separating such emulsion waste products is difficult based, in part, on the general chemistry of emulsions and, in part, because such emulsion waste products are heterogeneous materials produced through diverse and dissimilar processes. The extant technologies are varied but principally attempt to neutralize the charges at the surface of the component droplets and thereafter settle the demulsified residual mixture. Typically, a physical method such as centrifuging (with or without the application of heat, pressure, or both heat and pressure) is combined with one or more of the following:

a) the introduction of a surfactant such as a soap, cresylate, sulfide, sodium carbonate, sodium hydroxide, sodium silicate, or electrolyte bearing an electric charge and which travels to the interfacial film of the droplets, thus reinforcing the repulsion of the droplets;

b) the introduction of a cationic emulsion breaker (the dielectric constants of oil and water cause the oil droplets to carry a negative charge in water);

c) the lowering of the pH, as, for example, with sulphuric acid, to dissolve some of the stabilizing solids, which may range from colloidal to 100 microns, and may include soaps, sulfonated oils, asphaltic residue waxes, salt sulfides, and mercaptans;

d) the introduction of a demulsifying agent, such as polyvalent metal salts, mineral acids, adsorbents, polyamines and polyacrylates and their derivatives, alkyl substituted benzene sulfonic acids, alkyl phenolic resins and their derivatives, substituted polyalcohols, and the like, carrying both hydrophilic and lipophilic groups.

After charge neutralization and centrifugation have been effected, the resultant phases can be gravity separated, coalesced, filtered, solvent extracted, or eluted by means of floatation or activated carbon adsorption. These processes are expensive (in initial capital investment, ongoing maintenance, and use of natural resources) and inefficient; and thus an economical, efficient means of completely resolving a wide variety of industrial waste emulsions is needed.

Hereinafter in this description of the present invention, the words "hydrocarbon" or "hydrocarbons" shall include hydrophobic organic substances such as oils, bitumen, tars, oil residues, and petroleum products; and the words "soil" or "soils" shall include, as necessary, clays, sands, rocks, and spent drilling muds containing mixtures of water, petroleum oils, other organic liquids, inorganic and organic additives, suspended solids, and drill cuttings.

Hydrocarbon contamination of soils may occur inadvertently, for example, as a result of oil spills or leaks; or deliberately, for example, as a by-product of a process such as the petroleum exploration industry's production of contaminated sands during pumping of oils from oil wells. In the former case, soils at or adjacent to oil industry facilities such as oil wells, storage tanks, oil pipe lines, oil loading facilities, etc. can become contaminated with hydrocarbons; and owners of such sites may be required by regulatory bodies to remediate these soils. Known remediative methods such as the transfer of the contaminated material to approved off-site landfills or the application of physical or chemical methods to remove, stabilize, or destroy the substances may be effective but are expensive and under increasing regulatory scrutiny.

In the latter case, in oil well drilling operations, drilling fluids containing lubricants and chemical agents called "additives" are pumped through the drill string to lubricate the drill bit and assist in the removal of cuttings as they are flushed to the surface through the annulus around the drill pipe. The techniques described below are then used to separate the drilling fluids from the cuttings. The drilling fluids are then reused, and the cuttings are collected for transport to an approved off-site landfill or for further processing.

The simplest method of dealing with hydrocarbon-contaminated soils is to simply store such soils, either in situ or at approved off-site landfills. However, for regulatory and economic reasons such storage is no longer practicable in many jurisdictions: increasing environmental awareness and the resulting regulations, a paucity of suitable storage sites, and the economic realities of ongoing costs and liability risk (storage sites must be carefully maintained to protect against escape of contaminants into the environment) have combined to limit the applicability of this measure.

Another method used in the cleanup of hydrocarbon-contaminated soils is the disposal of such contaminated soils by incineration. Although this method is simple, inexpensive, and effective as a treatment for disposing of hydrocarbon-contaminated soil, it is extensively regulated and is not permitted in many jurisdictions.

Yet another method is to wash hydrocarbon-contaminated soils with water to mechanically cleanse contaminating hydrocarbons from the soil. In variants of this washing treatment, chemical additives are added to the wash water. However, in the water washing treatment and the variants thereof, the hydrocarbon contaminants and the chemical additives are then transferred to the water, and the water itself must be treated before it can be reused or returned to surface or ground water.

Lastly, and without being exhaustive of all extant methodologies, hydrocarbon-contaminated soil can be cleaned by hot water processing and flotation. Limitations to this method include one or more of high energy expense, poor flotation response, poor selectivity, or the generation of froth that is difficult to handle.

Thus, there is a need for the development of a cost effective, environmentally friendly, and regulatory compliant method for removing or remediating hydrocarbon contaminants from soils.

SUMMARY OF THE INVENTION

It is therefore an object of the present invention to provide a method to clean and separate contaminants from particulate matter in a cost-effective, environmentally friendly, and regulatory compliant manner.

It is a further object of the present invention to provide a method to clean and separate contaminating hydrocarbons from contaminated soils in a cost-effective, environmentally friendly, and regulatory compliant manner that will render such soil non-hazardous.

It is a further object of the present invention to provide a method to clean and separate the constituents of an emulsion in a cost-effective, environmentally friendly, and regulatory compliant manner.

It is a further object of the present invention to provide a method to separate particles of solid or semi-solid material from a liquid suspension in a cost-effective, environmentally friendly, and regulatory compliant manner.

These objectives and others are provided by the method described and detailed herein. The invention provides a method of separating a substance from particulate matter comprising the steps of: a) forming a fluid admixture of said particulate matter and a fluid; b) applying a shear force to said fluid admixture; c) applying vibration to said fluid admixture; and d) separating said substance from said particulate matter. According to one aspect, the substance is a hydrocarbon and said particulate matter is soil. According to a further aspect the fluid comprises water and the method further comprises the step of liquidizing the soil and hydrocarbon in the fluid admixture to form an aqueous slurry.

According to a further aspect of the invention, the invention comprises:
  a) agitating an admixture (be it an emulsion, suspension, mixture of solid and liquid, or mixture of solid and solid), a fluid, a surfactant (if used), and a dissolved solid (if used) so as to mechanically shear the constituents of said admixture and enhance the detachment or separation of said constituents of said admixture;
  b) vibrating said admixture so as to mechanically shear the constituents of said admixture and enhance the detachment or separation of said constituents of said admixture;
  c) introducing any or all of a surfactant, dissolved solids or gases, or an oil into the admixture, either individually in any combination and sequence or collectively;
  d) separating and stratifying the said constituents of said admixture by continuing the agitation, the vibration, or both the agitation and the vibration, concurrently, alternately, intermittently, or serially, or a combination thereof;
  e) consolidating the solids within said admixture by means of vibration.

The invention further provides an apparatus for carrying out the method, which in one aspect provides a receptacle; a means of applying a shear force onto particulate matter introduced into said receptacle; means for applying vibration to said receptacle; and means for removing said separated substance from said receptacle. The means of applying a shear force can be a helical screw conveyor with a reversible drive. The means for applying vibration can be a vibrator connected to the receptacle.

BRIEF DESCRIPTION OF DRAWINGS

In drawings which illustrate a preferred embodiment of the invention.

DETAILED DESCRIPTION OF THE INVENTION

Figure 1:
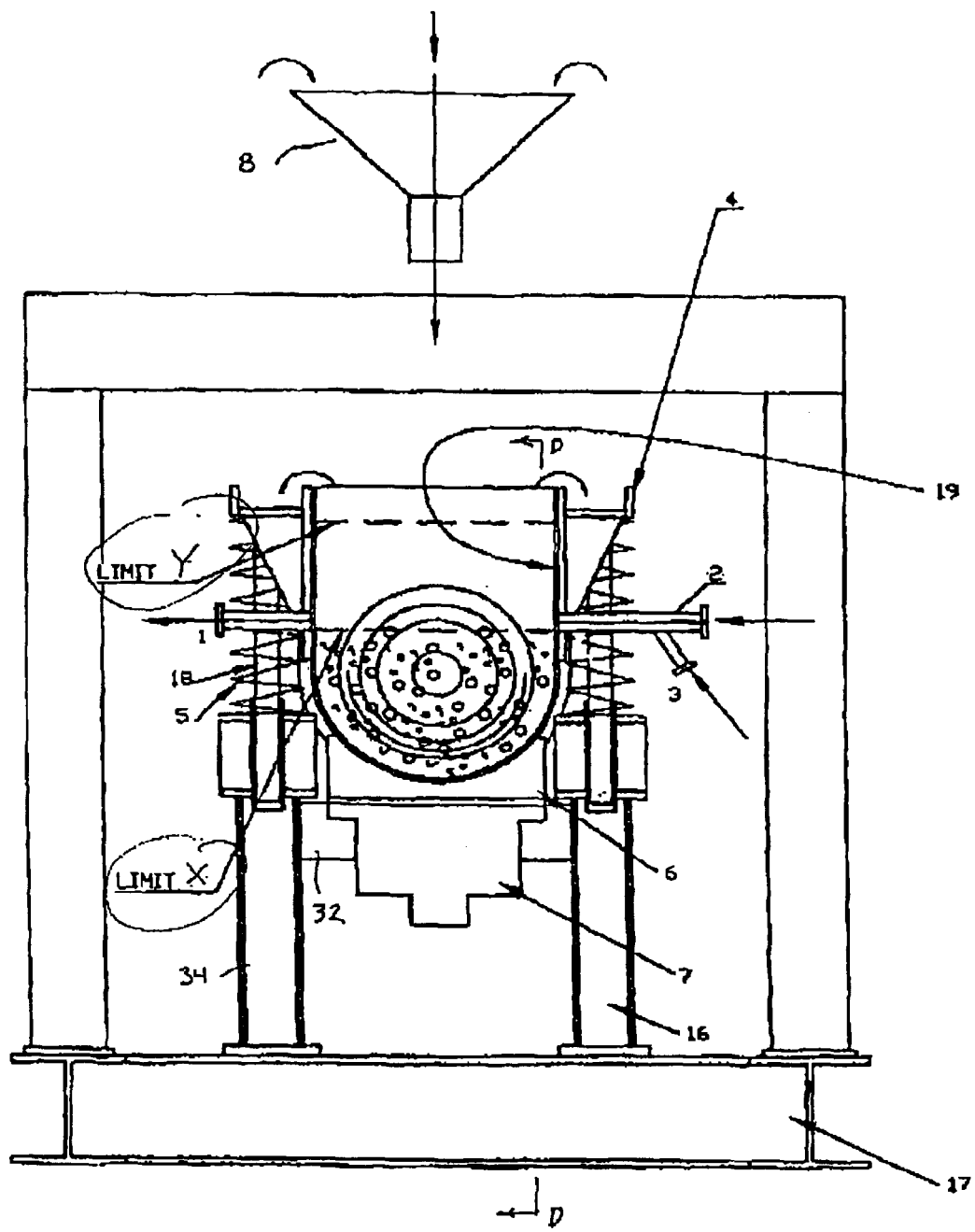
FIG. 1 is an end cross-sectional view of the apparatus according to the invention taken along lines C—C of FIG. 3, and wherein the screw drive assembly has been removed for ease of illustration.

The present invention relates to an apparatus and method which utilize shear force and vibration for the following purposes: to separate substances that tightly adsorb onto particulate matter from said particulate matter while concurrently or subsequently consolidating said particulate matter; to separate particles of solid or semi-solid material from a liquid suspension while concurrently or subsequently consolidating said semi-solid or solid material; and to separate suspended particles in and the constituents of an emulsion while concurrently or subsequently consolidating said suspended particles and said constituents of the emulsion. One particular application relates to the clean-up and remediation of hydrocarbon-contaminated soils. The method also has application in the separation of bitumen from tar sands. Where the term "soil" is used herein it will be understood that such term includes particulate matter such as soil, sand or other particulate matter which requires separation from a contaminating substance.

While the present invention is capable of embodiment in many different forms, there is shown in the drawings and will be described herein in detail a specific embodiment thereof with the understanding that the present disclosure is to be considered as an exemplification of the principles of the invention and is not intended to limit the invention to the specific embodiment or purpose illustrated. The present invention may be embodied in other specific forms and for other purposes and uses without departing from its spirit or essential characteristics. Accordingly, the specification and drawings are to be regarded in an illustrative, rather than a restrictive, sense.

Generally and as an overview, the synergy of the agitation and vibration described in detail below, diminishes the attractive force that allows hydrocarbons to adsorb or attach onto particles of hydrocarbon-contaminated soil thereby allowing the hydrocarbons to separate from the particles of contaminated soil.

The specific embodiment illustrated in FIG. 1 (which is a cross-section of the present invention through plane C—C of FIG. 3) comprises a receptacle (being a hollow container in which materials are processed) in the form of a trough 19 through which a motorized auger or helical screw conveyor 13 (FIG. 3) passes and below which a plurality of vibrators 7 are mounted. An elongated support frame 16 extends generally beneath the trough 19 and comprises the following: a pair of laterally spaced, longitudinally extending members 30; a plurality of spring-mount pegs 18 projecting generally vertically upwardly from the longitudinally extending members to support and operatively connect the trough 19 to the support frame 16; a plurality of transversely extending cross-members 32, and a plurality of vertically extending support members 34. A plurality of springs 5 extend from support frame 16 and over the pegs 18 to isolate the support frame 16 from the vibrations produced by the vibrators 7.

Figure 2:
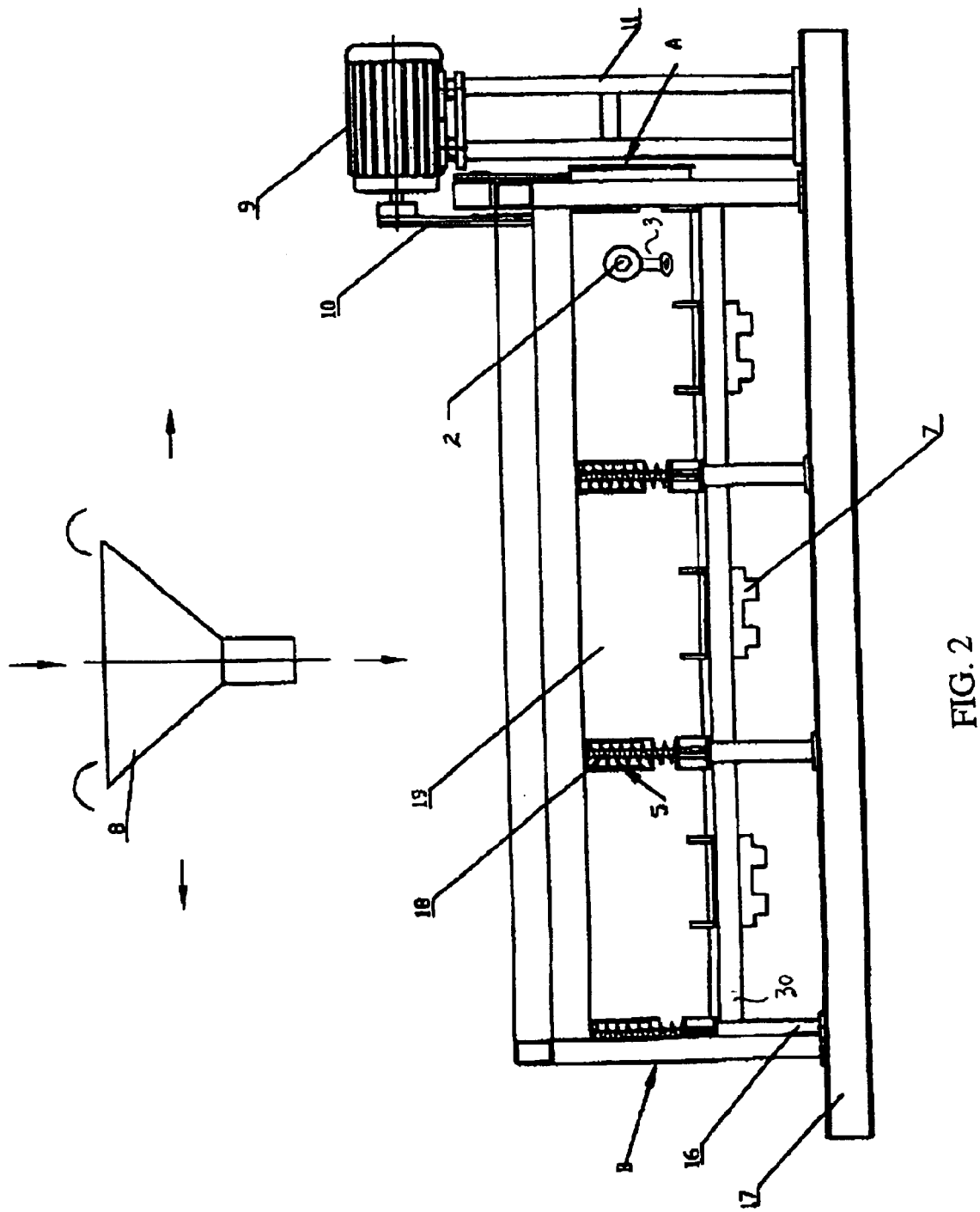
FIG. 2 is a side elevation view of the apparatus according to the invention.
Figure 3:
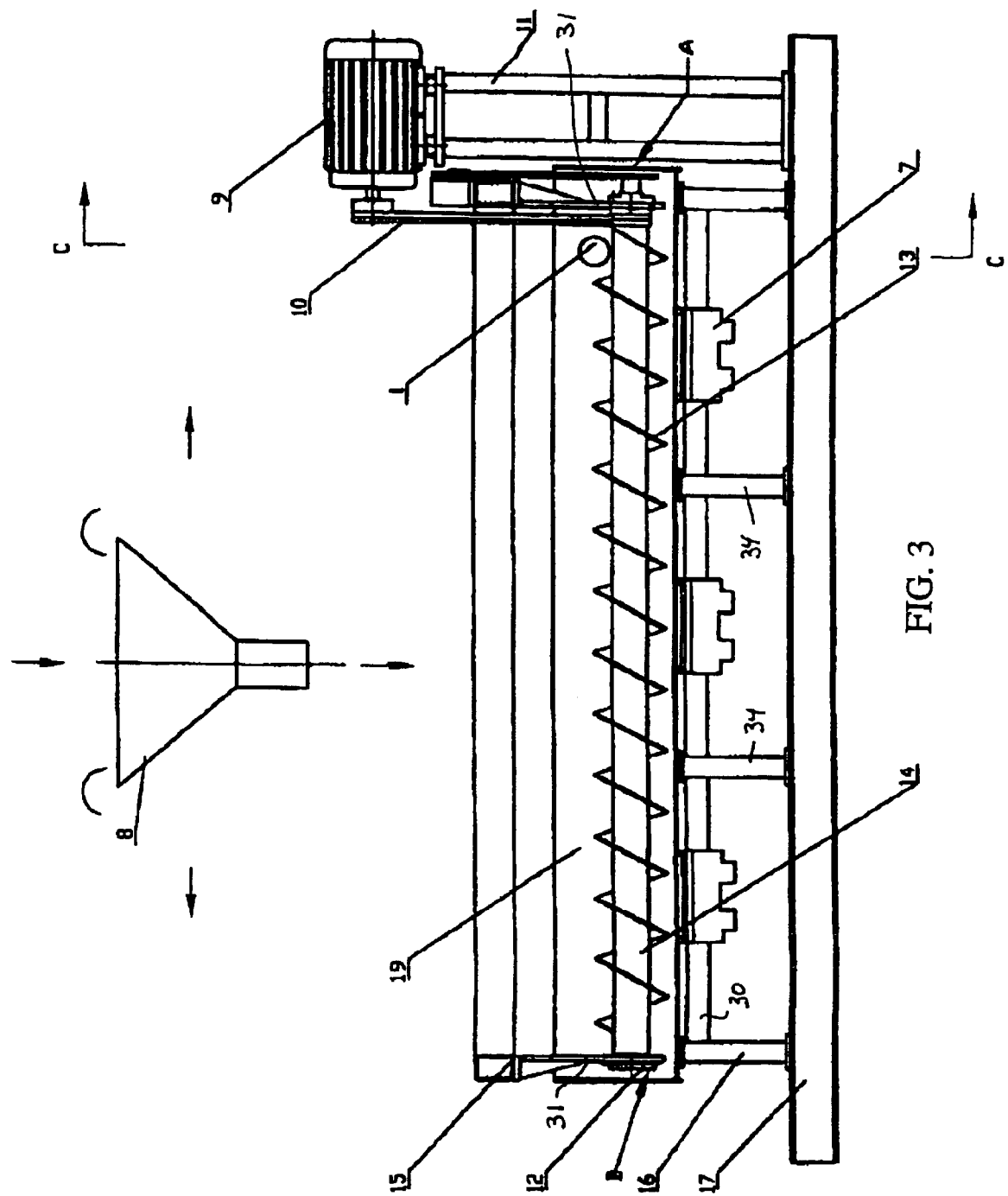
FIG. 3 is an longitudinal cross-sectional view of the apparatus according to the invention taken along lines D—D of FIG. 1.

FIG. 3 shows the motorized helical screw conveyor 13 mounted onto the conveyor frame 15 having a thrust end (marked as "A" in FIGS. 2 and 3) and a discharge end (marked as "B" in FIGS. 2 and 3) and a pair of downwardly depending support elements 31. Any of a multitude of means known within the art may be used to rotate the central shaft 14 of the helical screw conveyor 13. In the preferred embodiment, the central shaft 14 is rotated by a drive chain 10 which extends from a motor 9 into the trough 19 and around the central shaft 14.

A plurality of vibrators 7 are suspended below and from trough 19 by means of a plurality of yokes 6 attached to trough 19. The entire invention is mounted on a skid 17 that supports both the elongated support frame 16 and the conveyor frame 15 and comprises a pair of laterally spaced, longitudinally extending base members and a pair of transversely extending cross-members.

Various conventional systems of bulk material storage, transport, and feeding known to the art may be used to deliver the contaminated soil to the present invention. In the preferred embodiment, the contaminated soil is stored in a pile and transported to and into a feed hopper 8 by way of a front-end loader. Feed hopper 8 is then movable by overhead crane or the like to distribute the contaminated soil along the length of trough 19.

FIG. 3 shows trough 19 as an elongated, narrow, U-shaped receptacle into which the contaminated soil is introduced by means of the feed hopper 8 and from which the cleaned soil is removed through a butterfly valve 12 at its discharge end (marked as "B" in FIGS. 2 and 3). In the preferred embodiment, the volume of contaminated soil introduced should be such that the contaminated soil fills trough 19 throughout the length of trough 19 to at least the level designated Limit X in FIG. 3.

The helical screw conveyor 13 is activated immediately prior to or upon the introduction of the contaminated soil into trough 19. Concurrently or immediately thereafter, fluid is introduced into trough 19 by any of a multitude of means known within the art, but in the preferred embodiment by means of the fluid inlet 2 located towards the thrust end (marked as "A" in FIGS. 2 and 3 ) of trough 19. In the preferred embodiment, the volume of fluid introduced should be such that the admixture fills trough 19 throughout the length of trough 19 to at least the level indicated by Limit Y. Generally, the fluid can be at or below ambient temperature but preferably is at least at the temperature of the contaminated soil and most preferably is at least 60 degrees Celsius.

In the preferred embodiment, the fluid is fresh water with or without any or all of the following additives: a surfactant to aid in separation of the hydrocarbons adsorbed or entrained in the contaminated soil; an oil; dissolved solids, preferably inorganic salts such as sodium chloride, to increase the density of the fluid to aid in floating the hydrocarbons; or a gas dissolved in the fluid to increase the flotation effect.

As an example of one variation of the method herein, it is known that some contaminated soils contain hydrocarbons that are heavier than fresh water (or other fluid that may be introduced into trough 19), and which are likely to sediment with the solid phase of the contaminated soil. Therefore, a light oil, such as coker gas oil, can be added to the admixture to dissolve the heavy hydrocarbons and create a mixture that is lighter than water, thus causing them to float, facilitating the complete de-oiling of the contaminated soil. In an alternative variation, a salt, such as sodium chloride can be dissolved in the admixture to increase the density of the separated fluid phase. Most hydrocarbons will float above such a brine solution, which has a density of 1.2 g/l in normal conditions. The brine can be recycled in order to minimize salt consumption.

The fluid-to-contaminated-soil ratio is variable and is dependent on a myriad of factors, including but not limited to, the viscosity of the hydrocarbons, the mineral composition of the contaminated soil, the particulate sizes of the mineral matter in the contaminated soil, the temperature of the fluid, the ambient temperature, etc. Thus the volumetric percentage ratio of fluid to solid in the admixture can range from 40:60 to 90:10, more preferably between 50:50 and 70:30, and most preferably at 60:40.

The method of the invention entails the creation of an aqueous admixture within trough 19 by the mixing of the contaminated soil and the fluid. The aforesaid additives (if used) can then be introduced into the admixture, either individually in any combination and sequence or collectively, by any of a multitude of means known within the art. In the preferred embodiment the fluid additives are introduced into trough 19 through the additive injection line 3.

In the preferred embodiment, the mixing that consolidates the contaminated soil, the fluid, and the additives (if used) into an aqueous admixture is effected by means of helical screw conveyor 13; however, such mixing may also be accomplished using other processes known within the art, including impellers, rakes, screw assemblies, stirrers, etc. As well, helical screw conveyor 13 transports the admixture from the thrust end (marked as "A" in FIGS. 2 and 3) to the discharge end (marked as "B" in FIGS. 2 and 3) of trough 19 and back. In the preferred embodiment, such transportation is accomplished by means of a reversible motor 9 mounted on a stand 11 at and near the thrust end (marked as "A" in FIGS. 2 and 3) of the conveyor frame. The reversible motor 9 drives the helical screw conveyor 13 in one direction—be it clockwise or counter clockwise—for a defined period of time and thereafter drives helical screw conveyor 13 in the opposite direction for a defined period of time, which may or may not be equal to the initial period of time. The defined period of time may range from 10 to 300 seconds, more preferably between 100 to 200 seconds, and most preferably at 150 seconds.

Intermittently at defined times and for pre-set durations, the admixture is vibrated by means of the plurality of vibrators 7 suspended below trough 19; however, such vibration may also be accomplished using other means known within the art, including vibrating rods, sonic mixers, shakers, etc. The number of vibrators 7 is dependent on a myriad of factors, including but not limited to, the mass of the contaminated soil, the particulate sizes of the mineral matter in the contaminated soil, the volume of the trough 19, the length of the trough 19, the output of each individual vibrator, etc. Thus the number of vibrators can vary. As a general rule and per four lineal meters of trough 19, 1 to 6 vibrators can be used, more preferably 2 to 6 vibrators, and most preferably 3 vibrators.

The period of time the helical screw conveyor 13 is engaged prior to the activation of the vibrators 7 may range from 10 to 60 seconds, more preferably between 20 to 45 seconds, and most preferably at 30 seconds. As well, the period of time that the vibrators 7 are engaged may range from 10 to 60 seconds, more preferably between 20 to 45 seconds, and most preferably at 30 seconds. In the preferred embodiment, this process is repeated at least three times.

The helical screw conveyor 13 is then deactivated while vibrators 7 remain engaged, and the separated floating hydrocarbons are thereafter eluted by any of a multitude of means known within the art, whereby the lighter floating hydrocarbons may be extracted continuously or periodically. As can be seen in FIG. 3, in the preferred embodiment additional fluids are added into trough 19 through fluid inlet 2 such that the level of fluid in trough 19 rises above Limit Y thereby causing the lighter floating hydrocarbons to overflow into either or both of the discharge trays 4 located on either side of the length of said trough 19.

The remaining fluids in trough 19 are then removed by way of the fluid outlet 1 and the remaining solids in said trough 19 are removed by engaging the helical screw conveyor 13 and conveying such solids to and through butterfly valve 12 located at the discharge end (marked as "B" in FIGS. 2 and 3) of trough 19.

In another embodiment, a suspension or emulsion is introduced into trough 19 such that the suspension or emulsion fills the trough 19 throughout the length of trough 19 to at least Limit X, and the process described above is carried out.

Although the present invention has been described with particular reference to its use in the petroleum exploration and production industries, it is not limited to such use and has more general application in other industries respecting the separation, consolidation, or both separation and consolidation of: contaminants adhering to particulate matter; suspended particles in a suspension; suspended particles in and the constituents of an emulsion (being an intimate mixture of two immiscible liquids). As examples, the apparatus and method described herein have applicability in the treatment of industrial waste emulsions and in the treatment of sewage. In the latter example, particles of solid or semi-solid fecal matter can be separated from a liquid sewage suspension and thereafter consolidated for more applicable treatment.

The described embodiments are to be considered in all respects only as illustrative and not restrictive: it is to be understood that the terminology used is intended to be in the nature of words of description rather than of limitation. Many modifications and variations of the present invention are possible in light of the teachings herein; and, therefore, the scope of the present invention is indicated by the appended claims rather than by the foregoing description. All changes which come within the meaning and range of equivalency of the claims are to be embraced within their scope.

What is claimed is:

1. A method of separating a hydrocarbon from particulate matter comprising the steps of:
   a) introducing a fluid to said particulate matter in a container;
   b) mixing said fluid and said particulate matter to form a fluid admixture in said container wherein said mixing is done by a reversible helical screw conveyor in said container;
   c) after an initial period of mixing, alternately applying vibration to said fluid admixture in said container and then ceasing to apply vibration while said mixing is continued; and
   d) separating said hydrocarbon from said fluid admixture by flotation.

2. The method of claim 1 wherein said particulate matter is soil.

3. The method of claim 2 wherein said fluid comprises water.

4. The method of claim 3, further comprising the step of liquidizing said soil and said hydrocarbon in said fluid admixture to form an aqueous slurry.

5. The method of claim 4 wherein said aqueous slurry is at a 60:40 percentage volumetric ratio of fluid to particulate matter.

6. The method of claim 4 wherein said aqueous slurry has a temperature in a range from ambient temperature to 50 degrees Celsius.

7. The method of claim 4 wherein said aqueous slurry has a temperature of at least 60 degrees Celsius.

8. The method of claim 3 wherein said fluid further comprises a dissolved gas.

9. The method of claim 3 wherein the amount of fluid used is in excess of the amount of particulate matter used.

10. The method of claim 1 wherein a surfactant is introduced into said fluid admixture.

11. The method of claim 10 wherein said surfactant is selected from the group of soap, cresylate, sulfide, sodium carbonate, sodium hydroxide, sodium silicate, or electrolyte bearing an electric charge.

12. The method of claim 1 wherein an oil is introduced into said fluid admixture.

13. The method of claim 12 wherein said oil is a light oil.

14. The method of claim 13 wherein said oil light is a coker oil.

15. The method of claim 1 wherein a dissolved solid is introduced into said fluid admixture.

16. The method of claim 15 wherein said dissolved solid comprises an inorganic salt.

17. The method of claim 16 wherein said dissolved solid comprises sodium chloride.

18. The method of claim 1 wherein said fluid comprises water and a surfactant.

19. The method of claim 1 wherein said fluid comprises water and at least one dissolved solid to thereby raise the density of said fluid.

20. The method of claim 1 wherein said fluid comprises water, a surfactant, and at least one dissolved solid to thereby raise the density of said fluid.

21. The method of claim 1 wherein said fluid comprises saltwater.

22. The method of claim 1 wherein said fluid comprises saltwater and a surfactant.

23. The method of claim 1 wherein said fluid comprises saltwater and at least one dissolved solid which raises the density of said fluid.

24. The method of claim 1 wherein said fluid comprises saltwater, a surfactant, and at least one dissolved solid which raises the density of said fluid.

25. The method of claim 1 comprising the further steps of
   e) removing said fluid from said fluid admixture; and
   f) removing said particulate matter from said container.

26. The method of claim 25 further comprising the step of consolidating said particulate matter prior to removing from said container.

27. The method of claim 1 wherein said particulate matter is comprised in a slurry prior to step a).

28. The method of claim 1 wherein said particulate matter is comprised in an emulsion prior to step a).

29. The method of claim 1 wherein said mixing ceases while vibration is being applied to said fluid admixture.

30. The method of claim 1 wherein said helical screw conveyor transports said particulate matter horizontally while mixing.

31. The method of claim 30 wherein said container is a trough.

32. The method of claim 31 wherein said screw conveyor periodically reverses direction while mixing.

33. The method of claim 31 wherein said hydrocarbon is separated by flotation over the upper edges of the trough.

34. The method of claim 33 comprising the further steps of
   e) removing said fluid from said fluid admixture; and
   f) removing said particulate matter from said trough by conveying said particulate matter by means of said screw conveyor.

35. The method of claim 1 wherein there are at least three periods of application of vibration to said fluid admixture.

36. The method of claim 35 wherein the duration of said periods of application of vibration to said fluid admixture are between 10 and 60 seconds.

37. The method of claim 1 comprising the further step of ceasing said mixing and then applying a period of vibration prior to said separation step.

* * * * *